(12) United States Patent
Wang et al.

(10) Patent No.: US 8,710,394 B2
(45) Date of Patent: Apr. 29, 2014

(54) METHOD OF CONTROLLING AN INDENTATION DEPTH OF AN ELECTRODE INTO A METAL SUBSTRATE DURING WELDING

(75) Inventors: Pei-Chung Wang, Shanghai (CN); Daniel C. Hutchinson, Goodrich, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 324 days.

(21) Appl. No.: 13/060,070

(22) PCT Filed: Apr. 7, 2010

(86) PCT No.: PCT/CN2010/000453
§ 371 (c)(1),
(2), (4) Date: Feb. 22, 2011

(87) PCT Pub. No.: WO2011/123980
PCT Pub. Date: Oct. 13, 2011

(65) Prior Publication Data
US 2011/0253681 A1    Oct. 20, 2011

(51) Int. Cl.
*B23K 11/24*    (2006.01)
(52) U.S. Cl.
USPC .................................................. 219/108
(58) Field of Classification Search
USPC ...................................... 219/86.32, 108–110
See application file for complete search history.

(56) References Cited

U.S. PATENT DOCUMENTS

| 4,734,555 A * | 3/1988 | Ferguson ..................... 219/109 |
| 6,903,298 B2 * | 6/2005 | Wang et al. ................... 219/110 |
| 2009/0078683 A1 | 3/2009 | Khakhalev et al. | |

FOREIGN PATENT DOCUMENTS

| CN | 100395067 C | 6/2008 |
| CN | 101267908 A | 9/2008 |
| CN | 101396761 A | 4/2009 |

OTHER PUBLICATIONS

PCT International Search Report PCT/CN2010/000453, mailed on Jan. 20, 2011.

* cited by examiner

*Primary Examiner* — Dana Ross
*Assistant Examiner* — Renee L Miller
(74) *Attorney, Agent, or Firm* — Quinn Law Group, PLLC

(57) ABSTRACT

A method of controlling an indentation depth of an electrode into a metal substrate during formation of a weld includes selecting a weld force, current, duration, minimum indentation depth, and maximum indentation depth, contacting the substrate with the electrode to apply the force to the substrate, supplying the current to the electrode to initiate formation of the weld according to a first condition in which the depth is less than the minimum, a second condition in which the depth is greater than or equal to the minimum and less than or equal to the maximum, and a third condition in which the depth is greater than the maximum, and comparing the depth, minimum, and maximum. For the first condition, duration is changed. For the second condition, each of the force, current, and duration is maintained until the weld is substantially formed. For the third condition, current ceases to be supplied.

8 Claims, 1 Drawing Sheet

METHOD OF CONTROLLING AN INDENTATION DEPTH OF AN ELECTRODE INTO A METAL SUBSTRATE DURING WELDING

CROSS-REFERENCE TO RELATED APPLICATIONS

This application claims the benefit of International Application No. PCT/CN2010/000453, filed Apr. 7, 2010, which is hereby incorporated by reference in its entirety.

TECHNICAL FIELD

The present disclosure generally relates to controlling an indentation depth of an electrode into a metal substrate during formation of a weld.

BACKGROUND

Welding may be used to join two or more metal substrates. In general, welding may include clamping a workpiece, e.g., the two or more metal substrates to be joined, between two electrodes with a force, and passing an electrical current from one electrode, through the workpiece, to the second electrode for a duration to thereby complete an electrical circuit. The electrical current causes sufficient heat due to electrical resistance to build up at an interface between the metal substrates, i.e., at a faying surface of each metal substrate, so as to partially and momentarily melt the interface. Therefore, a combination of the force, current, and weld duration forms a weld nugget, i.e., the weld, to join the metal substrates.

Although the weld is formed within an interior of the workpiece between faying surfaces of the metal substrates, the weld may be perceivable as an indentation on an exterior surface of the workpiece. That is, each electrode may form an indentation having a depth at a point of contact with the metal substrate.

SUMMARY

A method of controlling an indentation depth of an electrode into a first metal substrate during formation of a weld between the first metal substrate and a second metal substrate includes selecting each of a weld force, a weld current, a weld duration, a minimum indentation depth of the electrode into the first metal substrate, and a maximum indentation depth of the electrode into the first metal substrate. After selecting, the method includes contacting the first metal substrate with the electrode to thereby apply the weld force to the first metal substrate. The electrode has a distal end having a shape defined by a radius of greater than or equal to about 20 mm. After contacting, the method includes supplying the weld current to the distal end of the electrode to thereby initiate formation of the weld according to at least one of a first condition in which the indentation depth is less than the minimum indentation depth, a second condition in which the indentation depth is greater than or equal to the minimum indentation depth and less than or equal to the maximum indentation depth, and a third condition in which the indentation depth is greater than the maximum indentation depth. The method further includes comparing the indentation depth to each of the minimum indentation depth and the maximum indentation depth to determine that formation of the weld is continuing according to one of the first condition, the second condition, and the third condition. If it is determined that the first condition exists, the method includes changing the weld duration until the indentation depth is greater than or equal to the minimum indentation depth. If it is determined that the second condition exists, maintaining each of the weld force, the weld current, and the weld duration until the weld is substantially formed. Further, if it is determined that the third condition exists, the method includes ceasing to supply the weld current to the distal end of the electrode until the weld is substantially formed.

The method results in welds having desired appearance and tensile strength. That is, the method provides a minimized indentation depth for the weld without compromising the size and/or tensile strength of the weld. Further, the minimized indentation depth contributes to an excellent appearance of metal substrates that are visible to end-users of a workpiece. The method also minimizes costly and time-consuming repairs of welds having unacceptable appearance and/or tensile strength due to excessive indentation depths.

The above features and advantages and other features and advantages of the present disclosure are readily apparent from the following detailed description of the best modes for carrying out the disclosure when taken in connection with the accompanying drawings.

DETAILED DESCRIPTION

Figure 1:
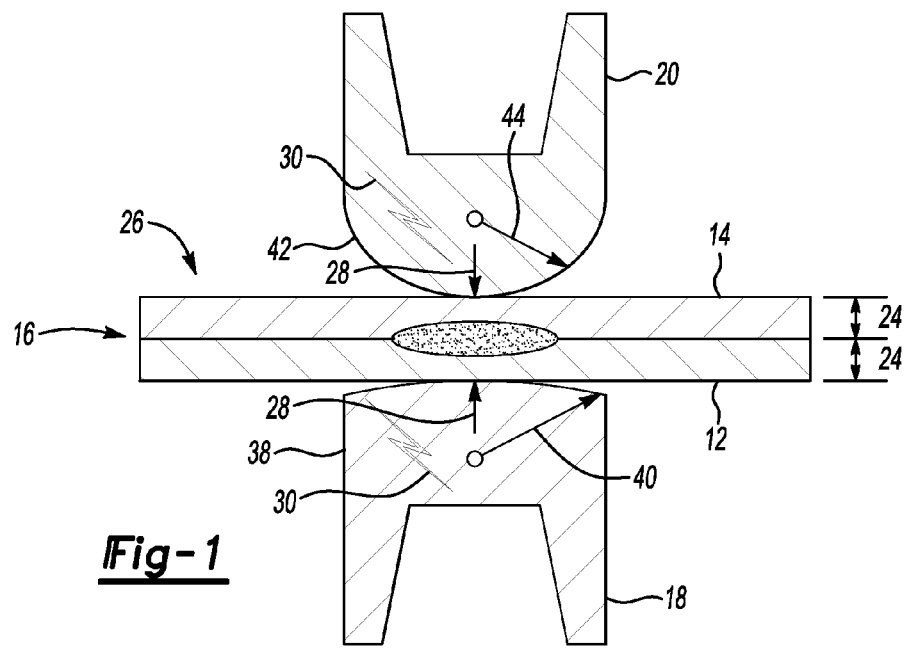
FIG. 1 is a schematic cross-sectional view of two metal substrates disposed between and in contact with two electrodes during formation of a weld.
Figure 2:
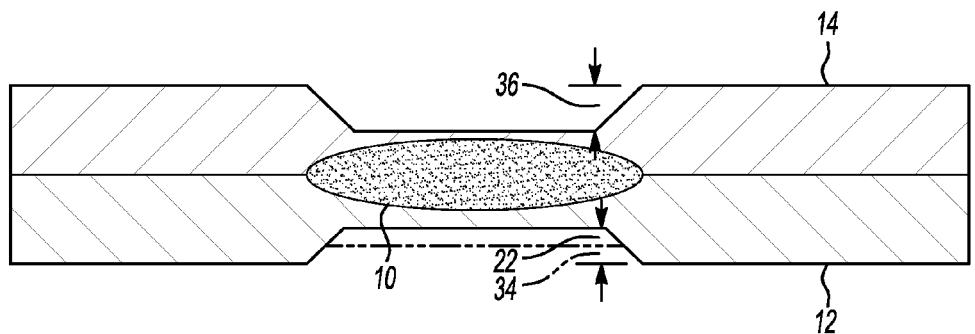
FIG. 2 is a schematic cross-sectional view of the two metal substrates of FIG. 1 after formation of the weld.

Referring to the Figures, wherein like reference numerals refer to like elements, a weld is shown generally at 10 in FIG. 2. The weld 10 of FIG. 2 may be formed between a first metal substrate 12 and a second metal substrate 14 via welding, e.g., resistance spot welding or weld-bonding, as set forth in more detail below. Such welding may be useful for joining the first metal substrate 12 and the second metal substrate 14 for applications requiring a strong weld 10 at a faying interface 16 (FIG. 1) between the first metal substrate 12 and the second metal substrate 14. By way of general explanation, welding may be carried out via a welding device (not shown) that may include a supply of electrical current and two electrodes 18, 20 (FIG. 1) configured for clamping together each of the first metal substrate 12 and the second metal substrate 14.

Referring to FIGS. 1 and 2, a method of controlling an indentation depth 22 (FIG. 2) of an electrode 18 (FIG. 1) into the first metal substrate 12 during formation of the weld 10 (FIG. 2) between the first metal substrate 12 and the second metal substrate 14 is disclosed herein. In particular, the method may be useful for applications such as, but not limited to, automotive applications requiring a strong weld 10 with excellent appearance.

Referring to FIG. 1, each of the first metal substrate 12 and the second metal substrate 14 may be any suitable metal. For example, one or both of the first metal substrate 12 and the second metal substrate 14 may be selected from the group of steel and aluminum, including alloys thereof. Further, the first metal substrate 12 may be formed from the same or different metal than the second metal substrate 14. That is, the method may be useful for joining same or dissimilar metallurgical compatible metals. In addition, each of the first metal substrate 12 and the second metal substrate 14 may have any suitable thickness 24. Although shown in FIG. 1 as having similar thicknesses 24, the first metal substrate 12 and the second metal substrate 14 may have the same or different thicknesses 24. By way of a non-limiting example, the thickness 24 of each of the first metal substrate 12 and the second metal substrate 14 may be from about 0.2 mm to about 6 mm.

As shown in FIG. 1, in preparation for performing the method, the first metal substrate 12 and the second metal substrate 14 may be sandwiched together, i.e., disposed adjacent and in contact with each other, to form a workpiece 26. The first metal substrate 12 and the second metal substrate 14 may contact each other at the faying interface 16. As used herein, the first metal substrate 12 of the workpiece 26 may be visible to an eventual end-user of the workpiece 26. For example, for automotive applications, the first metal substrate 12 may be a door surface of a vehicle (not shown) that may be visible during ingress and egress of the vehicle.

The method, as described with reference to FIGS. 1-3, includes selecting each of a weld force (designated by arrows 28 in FIG. 1), a weld current (designated by symbol 30 in FIG. 1), a weld duration 32 (FIG. 3), a minimum indentation depth 34 (FIG. 2) of the electrode 18 into the first metal substrate 12, and a maximum indentation depth 36 (FIG. 2) of the electrode 18 (FIG. 1) into the first metal substrate 12. Each of the minimum indentation depth 34 and the maximum indentation depth 36 may be selected according to a desired appearance of the weld 10. That is, the minimum indentation depth 34 and the maximum indentation depth 36 may be selected according to consumer preferences for the desired application. For example, for automotive applications, the minimum indentation depth 34 may be greater than or equal to about 0.11 mm and the maximum indentation depth 36 may be less than or equal to about 0.25 mm.

In contrast, each of the weld force 28, the weld current 30, and the weld duration 32 may be selected according to a desired size and/or tensile strength, e.g., from about 5 kN to about 10 kN, of the weld 10. Additionally or alternatively, each selection may be determined according to the metal type and thickness of each of the first and second metal substrates 12, 14, and/or the desired size, e.g., shape and diameter, of the weld 10. Moreover, the selected weld force 28, weld current 30, and weld duration 32 may define the indentation depth 22, as set forth in more detail below.

More specifically, as used herein and described with reference to FIG. 1, the terminology "weld force 28" refers to a force necessary to clamp the first metal substrate 12 and the second metal substrate 14 together between each of two electrodes 18, 20 of the welding device (not shown). In general, as the weld force 28 increases, electrical resistance between the first metal substrate 12 and the second metal substrate 14 may decrease. For a given weld duration 32 (FIG. 3), the decrease in electrical resistance requires a comparatively larger weld current 30 to develop the same amount of heat build-up at the faying interface 16. By way of a non-limiting example, depending upon the metal type and thickness of the first and second metal substrates 12, 14 and the desired tensile strength of the weld 10, the weld force 28 may be from about 2 kN to about 5 kN.

Referring again to FIG. 1, as used herein, the terminology "weld current 30" refers to a voltage of electrical current necessary to produce sufficient heat from electrical resistance to form the weld 10 (FIG. 2) at the faying interface 16. The weld current 30 may be routed through one electrode 18, through the workpiece 26, and through another electrode 20 to complete an electrical circuit, as set forth in more detail below. In general, for a given weld force 28 and weld duration 32 (FIG. 3), higher weld currents 30 enable formation of a relatively larger weld 10 (FIG. 2) and a relatively larger indentation depth 22 (FIG. 2) as compared to lower weld currents 30. For the method, depending upon the metal type and/or thickness of the first and second metal substrates 12, 14, and the desired tensile strength of the weld 10 (FIG. 2), the weld current 30 may be from about 7 kA to about 11 kA.

Figure 3:
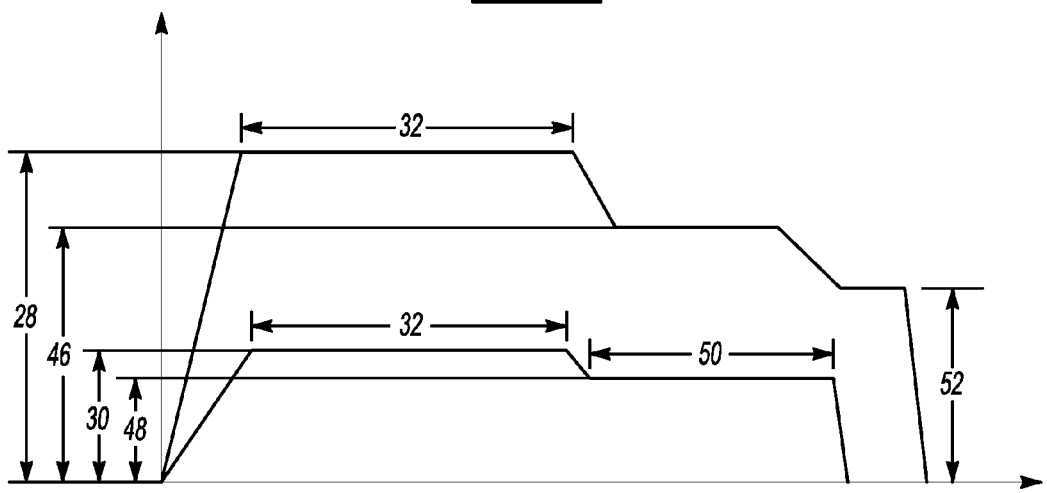
FIG. 3 is a graphical representation of a relationship between weld force, weld current, and weld duration.

Referring now to FIG. 3, the terminology "weld duration 32", as used herein, refers to an amount of time that the workpiece 26 (FIG. 1) is subjected to welding. In general, for a given weld force 28 and weld current 30, longer weld durations 32 enable formation of a relatively larger weld 10 (FIG. 2) and a relatively larger indentation depth 22 (FIG. 2) as compared to shorter weld durations 32. The weld duration 32 may be selected according to metal type and/or thickness of the first and second metal substrates 12, 14 (FIG. 1) and the desired tensile strength of the weld 10 (FIG. 2). Depending on the required application, for the method, the weld duration 32 may range from about 8 cycles to about 12 cycles, wherein a cycle is defined as $\frac{1}{60}^{th}$ of a second.

Described with reference to FIG. 1, the method also includes, after selecting, contacting the first metal substrate 12 with the electrode 18 to thereby apply the weld force 28 to the first metal substrate 12. That is, the electrode 18 may be moveable with respect to the first metal substrate 12 and may be connected to an arm (not shown) or other element configured for positioning the electrode 18 adjacent and in contact with the first metal substrate 12. For example, the electrode 18 may be a servomotor-driven moveable electrode 18.

As shown in FIG. 1, the electrode 18 has a distal end 38 having a shape defined by a radius 40 of greater than or equal to about 20 mm. That is, the distal end 38 may be configured for contacting the first metal substrate 12, and may have a shape defined by, for example, a radius 40 of from about 20 mm to about 80 mm. More specifically, the distal end 38 may have a shape defined by a radius 40 of from about 35 mm to about 50 mm. In one specific variation useful for joining steel metal substrates 12, 14, the distal end 38 may have a shape defined by a radius 40 of about 50 mm. That is, the electrode 18 may be classified as an R-50 electrode 18 and/or a long-radius electrode 18. Without intending to be limited by theory, the radius 40 of the distal end 38 of the electrode 18 may contribute to the excellent indentation depth 22 (FIG. 2) and tensile strength of the weld 10 (FIG. 2) formed by the method. That is, the curvature of the distal end 38 may minimize unacceptable indentation depths and/or necessary repair of welds 10.

Referring again to FIG. 1, the first metal substrate 12 and the second metal substrate 14 may be sandwiched together and so that the workpiece 26 is clamped between, and disposed in contact with, each of the electrode 18 and a second electrode 20. Therefore, the method may also include contacting the second metal substrate 14 with the second electrode 20 to thereby apply the weld force 28 to the second metal substrate 14. The second electrode 20 may also be fixed or moveable with respect to the second metal substrate 14 and may be connected to an arm (not shown) or other element configured for positioning the second electrode 20 adjacent and in contact with the second metal substrate 14.

The second electrode 20 may also have a second distal end 42 having a shape defined by a second radius 44 of less than about 20 mm. That is, the second distal end 42 of the second electrode 20 may contact the second metal substrate 14, and may have a shape defined by, for example, a second radius 44 of about 10 mm. Therefore, the second distal end 42 of the second electrode 20 may be relatively rounder as compared to the distal end 38 of the first electrode 18. The second electrode 20 may be classified as a B-nose electrode 20 and/or a short-radius electrode 20. Moreover, the second electrode 20 may be the same or different than the first electrode 18. That is, the second electrode 20 may have a shape similar to or different from the long-radius electrode 18. However, for applications requiring excellent indentation depth 22 (FIG. 2) into only the first metal substrate 12, the second electrode 20 may be defined by a short radius.

Since each of the electrode 18 and the second electrode 20 may conduct the weld current 30 (FIG. 1), as set forth in more detail below, each electrode 18, 20 may be formed from any suitable electrically-conductive metal. For example, each of the electrode 18 and the second electrode 20 may be formed from copper.

Referring now to FIGS. 1 and 2, the method further includes, after contacting, supplying the weld current 30 to the distal end 38 of the electrode 18 to thereby initiate formation of the weld 10 according to at least one a first condition in which the indentation depth 22 is less than the minimum indentation depth 34, a second condition in which the indentation depth 22 is greater than or equal to the minimum indentation depth 34 and less than or equal to the maximum indentation depth 36, and a third condition in which the indentation depth 22 is greater than the maximum indentation depth 36. As set forth above and described with reference to FIG. 1, the weld current 30 may be supplied from a source of electrical energy (not shown) to the electrode 18, through the workpiece 26, i.e., the first metal substrate 12 and the second metal substrate 14, and through the second electrode 20 to complete the electrical circuit. As the weld current 30 is supplied, the electrode 18 may begin to form the indentation depth 22 that is either less than the minimum indentation depth 34, i.e., the first condition, greater than or equal to the minimum indentation depth 34 and less than or equal to the maximum indentation depth 36, i.e., the second condition, or greater than the maximum indentation depth 36, i.e., the third condition.

The method further includes comparing the indentation depth 22 to each of the minimum indentation depth 34 and the maximum indentation depth 36 to determine that formation of the weld 10 is continuing according to one of the first condition, the second condition, and the third condition. For example, comparing may include measuring the indentation depth 22 and calculating a difference between the measured indentation depth 22 and the selected minimum indentation depth 34 and/or selected maximum indentation depth 36. Alternatively or additionally, the indentation depth 22 may be calculated according to a displacement of the electrode 18 towards the first metal substrate 12 with respect to a starting position. That is, for applications including the servomotor-driven moveable electrode 18, the displacement of the electrode 18 may be measured and/or calculated to determine a difference between the indentation depth 22, the minimum indentation depth 34, and/or the maximum indentation depth 36.

Referring to FIGS. 1-3, if it is determined that the first condition exists, the method includes changing the weld duration 32 (FIG. 3) until the indentation depth 22 is greater than or equal to the minimum indentation depth 34. For example, referring to FIG. 2, after the indentation depth 22 is compared to each of the minimum indentation depth 34, e.g., about 0.11 mm, and maximum indentation depth 36, e.g., about 0.25 mm, and found to be less than the minimum indentation depth 34, the weld duration 32 may be extended, i.e., prolonged, so that formation of the weld 10 may continue and the indentation depth 22 may increase to larger than the minimum indentation depth 34.

With continued reference to FIGS. 1-3, if it is determined that the second condition exists, the method also includes maintaining each of the weld force 28 (FIG. 1), the weld current 30 (FIG. 1), and the weld duration 32 (FIG. 3) until the weld 10 is substantially formed (as shown generally in FIG. 2). That is, referring to FIG. 2, after the indentation depth 22 is compared to each of the minimum indentation depth 34 and the maximum indentation depth 36 and found to be greater than or equal to the minimum indentation depth 34 and less than or equal to the maximum indentation depth 36, each of the weld force 28 (FIG. 1), the weld current 30 (FIG. 1), and the weld duration (FIG. 3) is maintained, i.e., not changed, until the weld 10 is substantially formed according to the desired tensile strength and/or size.

Referring again to FIGS. 1-3, if it is determined that the third condition exists, the method also includes ceasing to supply the weld current 30 (FIG. 1) to the distal end 38 of the electrode 18 until the weld (FIG. 2) is substantially formed. That is, referring to FIG. 2, after the indentation depth 22 is compared to each of the minimum indentation depth 34 and the maximum indentation depth 36 and found to be greater than the maximum indentation depth 36, the weld current 30 (FIG. 1) may be shut off, i.e., not applied, to the electrode 18 until the weld 10 (FIG. 2) is substantially formed. As the weld current 30 (FIG. 1) is ceased to be supplied, i.e., shut off, to the electrode 18, the weld 10 may cool until the weld 10 is substantially formed according to the desired tensile strength and/or size. Further, the method may also include decreasing the selected weld current 30 (FIG. 1) for formation of a next subsequent weld 10. And, after formation of the next subsequent weld 10 according to the adjusted selected weld current 30 (FIG. 1), the indentation depth 22 may be compared to each of the minimum indentation depth 34 and the maximum indentation depth 36 as set forth above.

It is to be appreciated that the method may further include repeatedly comparing the indentation depth 22 to the minimum indentation depth 34 and/or the maximum indentation depth 36 to determine that formation of the weld 10 is continuing according to one of the first condition, the second condition, and the third condition. That is, as described with reference to FIG. 2, the method may include repeatedly comparing the indentation depth 22 to the minimum indentation depth 34 and/or the maximum indentation depth 36 during formation to determine whether formation of the weld 10 is continuing according to the first condition, i.e., whether the indentation depth 22 is less than the minimum indentation depth 34, the second condition, i.e., whether the indentation depth 22 remains greater than or equal to the minimum indentation depth 34 and less than or equal to the maximum indentation depth 36, or the third condition, i.e., whether the indentation depth 22 becomes greater than the maximum indentation depth 36, until the weld is substantially formed according to the desired tensile strength and/or size. And, if formation of the weld 10 is continuing according to the first condition, i.e., if the indentation depth 22 is less than the minimum indentation depth 34, or the third condition, i.e., if the indentation depth 22 exceeds the maximum indentation depth 36, at least one of the weld force 28 (FIG. 1), the weld current 30 (FIG. 1), and/or the weld duration 32 (FIG. 3) may be changed in response to the first condition or the third condition until the weld 10 is substantially formed and the indentation depth 22 is greater than or equal to the minimum indentation depth 34 and less than or equal to the maximum indentation depth 36. Therefore, the method may include a feedback loop to repeatedly measure the indentation depth 22 and compare the indentation depth 22 to each of the minimum indentation depth 34 and the maximum indentation depth 36.

Further, any combination of the weld force 28, the weld current 30, and the weld duration 32 may be changed in response to one of the first condition and the third condition. For example, the weld duration 32 may be lengthened in increments so as to ensure that the indentation depth 22 is greater than or equal to the minimum indentation depth 34. Additionally, the weld current 30 may be shut off to the electrode 18 to ensure that the indentation depth 22 is less than or equal to the maximum indentation depth 36. Alternatively, both the weld force 28 and the weld current 30 may be decreased to ensure the occurrence of the second condition.

For example, as described with reference to FIG. 3, the method may further include selecting each of a second weld force 46 that is less than the weld force 28, a second weld current 48 that is less than the weld current 30, and a second weld duration 50 that is less than the weld duration 32.

Therefore, referring now to FIGS. 1-3, in this example, contacting may be further defined as disposing the first metal substrate 12 adjacent and in contact with the electrode 18 to thereby apply the second weld force 46 (FIG. 3) to the first metal substrate 12. In addition, in this example, the method may further include, after disposing to thereby apply the second weld force 46 (FIG. 3), supplying the second weld current 48 (FIG. 3) to the distal end 38 of the electrode 18 for the second weld duration 50 (FIG. 3) to thereby substantially form the weld 10 (FIG. 2) so that the indentation depth 22 is greater than or equal to the minimum indentation depth 34 and less than or equal to the maximum indentation depth 36.

Stated differently, and as summarized by the exemplary weld schedule of FIG. 3, the method may include stepping down each of the weld force 28 and the weld current 30 to the second weld force 46 and the second weld current 48, respectively. That is, the method may include applying each of the weld current 30 for a first number of cycles, i.e., for the weld duration 32, and the second weld current 48 for a second number of cycles, i.e., for the second weld duration 50, in a dual-pulse fashion to the electrode 18.

In another example, described with continued reference to FIG. 3, the method may further include selecting a third weld force 52 that is less than the second weld force 46. Therefore, in this example, contacting may be further defined as disposing the first metal substrate 12 adjacent and in contact with the electrode 18 to thereby apply the third weld force 52 to the first metal substrate 12 without supplying each of the weld current 30 and the second weld current 48 to the electrode 18. That is, the third weld force 52 may be applied during a cooling phase, i.e., a phase without weld current 30, 48, to allow substantial formation of the weld 10.

By way of a non-limiting example, for a first metal substrate 10 formed from steel and having a thickness of about 0.7 mm and a second metal substrate 10 formed from steel and having a thickness of about 1 mm, the aforementioned method may produce a weld 10 having a tensile strength of about 9 kN when the method is performed with an R-50 electrode 18 and a B-nose second electrode 20 at a weld current 30 of about 6.5 kA, a weld force 28 of about 3 kN, and a weld duration 32 of about 8.5 cycles. In this example, the indentation depth 22 is about 0.15 mm, and the resulting weld 10 has a diameter of about 2.75 mm.

The method results in welds 10 having desired appearance and tensile strength. That is, the method provides a minimized indentation depth 22 for the weld 10 without compromising the size and/or tensile strength of the weld 10. Further, the minimized indentation depth 22 contributes to an excellent appearance of metal substrates 12 that are visible to end-users of a workpiece 26. The method also minimizes costly and time-consuming repairs of welds having unacceptable appearance and/or tensile strength due to excessive indentation depths.

While the best modes for carrying out the disclosure have been described in detail, those familiar with the art to which this disclosure relates will recognize various alternative designs and embodiments for practicing the disclosure within the scope of the appended claims.

The invention claimed is:

1. A method of controlling an indentation depth of an electrode into a first metal substrate during formation of a weld between the first metal substrate and a second metal substrate, the method comprising:
   selecting each of a weld force, a weld current, a weld duration, a minimum indentation depth of the electrode into the first metal substrate, and a maximum indentation depth of the electrode into the first metal substrate, wherein the electrode has a distal end having a shape defined by a radius of from about 35 mm to about 50 mm;
   clamping together each of the first and second metal substrates between the electrode and a second electrode, wherein the second electrode includes a second distal end defined by a second radius of less than about 20 mm;
   contacting the first metal substrate with the electrode to thereby apply the weld force to the first metal substrate;
   supplying the weld current to the distal end of the electrode to thereby initiate formation of the weld according to at least one of a first condition in which the indentation depth is less than the minimum indentation depth, a second condition in which the indentation depth is greater than or equal to the minimum indentation depth and less than or equal to the maximum indentation depth, and a third condition in which the indentation depth is greater than the maximum indentation depth;
   comparing the indentation depth to each of the minimum indentation depth and the maximum indentation depth to determine that formation of the weld is continuing according to one of the first condition, the second condition, and the third condition;
   if it is determined that the first condition exists, changing the weld duration without changing the weld current until the indentation depth is greater than or equal to the minimum indentation depth;
   if it is determined that the second condition exists, maintaining each of the weld force, the weld current, and the weld duration until the weld is substantially formed; and
   if it is determined that the third condition exists, ceasing to supply the weld current to the distal end of the electrode until the weld is substantially formed.

2. The method of claim 1, wherein the radius at the distal end of the electrode is about 50 mm and the second radius at the second distal end of the second electrode is about 10 mm.

3. The method of claim 1, wherein the maximum indentation depth is less than or equal to about 0.25 mm.

4. The method of claim 1, wherein the minimum indentation depth is greater than or equal to about 0.11 mm.

5. A method of controlling an indentation depth of an electrode into a first metal substrate during formation of a weld between the first metal substrate and a second metal substrate, the method comprising:
   selecting each of a weld force, a weld current, a weld duration, a minimum indentation depth of the electrode into the first metal substrate, and a maximum indentation depth of the electrode into the first metal substrate, wherein the electrode has a distal end having a shape defined by a radius of from about 35 mm to about 50 mm;

selecting each of a second weld force that is less than the weld force, a second weld current that is less than the weld current, and a second weld duration that is less than the weld duration;

selecting a third weld force that is less than the second weld force;

clamping together each of the first and second metal substrates between the electrode and a second electrode, wherein the second electrode includes a second distal end defined by a second radius of less than about 20 mm;

contacting the first metal substrate with the electrode to thereby apply the weld force to the first metal substrate;

supplying the weld current to the distal end of the electrode to thereby initiate formation of the weld according to at least one of a first condition in which the indentation depth is less than the minimum indentation depth, a second condition in which the indentation depth is greater than or equal to the minimum indentation depth and less than or equal to the maximum indentation depth, and a third condition in which the indentation depth is greater than the maximum indentation depth;

comparing the indentation depth to each of the minimum indentation depth and the maximum indentation depth to determine that formation of the weld is continuing according to one of the first condition, the second condition, and the third condition;

if it is determined that the first condition exists, changing the weld duration without changing the weld current until the indentation depth is greater than or equal to the minimum indentation depth;

if it is determined that the second condition exists, maintaining each of the weld force, the weld current, and the weld duration; and if it is determined that the third condition exists, ceasing to supply the weld current to the distal end of the electrode;

after supplying the weld current for the weld duration, disposing the first metal substrate adjacent to and in contact with the electrode to thereby apply the second weld force to the first metal substrate;

after disposing, supplying the second weld current to the distal end of the electrode for the second weld duration to thereby substantially form the weld so that the indentation depth is greater than or equal to the minimum indentation depth and less than or equal to the maximum indentation depth;

after supplying the second weld current, disposing the first metal substrate adjacent to and in contact with the electrode to thereby apply the third weld force to the first metal substrate without supplying each of the weld current and the second weld current to the electrode.

6. The method of claim 5, wherein the radius at the distal end of the electrode is about 50 mm and the second radius at the second distal end of the second electrode is about 10 mm.

7. The method of claim 5, wherein the maximum indentation depth is less than or equal to about 0.25 mm.

8. The method of claim 5, wherein the minimum indentation depth is greater than or equal to about 0.11 mm.

* * * * *